United States Patent [19]

Albach et al.

[11] Patent Number: 5,729,447
[45] Date of Patent: Mar. 17, 1998

[54] SWITCHED-MODE POWER SUPPLY

[75] Inventors: Manfred Albach; Thomas Dürbaum, both of Aachen, Germany

[73] Assignee: U.S. Philips Corporation, New York, N.Y.

[21] Appl. No.: 637,704
[22] PCT Filed: Sep. 5, 1995
[86] PCT No.: PCT/IB95/00730
§ 371 Date: Apr. 30, 1996
§ 102(e) Date: Apr. 30, 1996
[87] PCT Pub. No.: WO96/08071
PCT Pub. Date: Mar. 14, 1996

[30] Foreign Application Priority Data

Sep. 9, 1994 [DE] Germany ............... 44 32 077.9

[51] Int. Cl.[6] .................. H02H 7/122; H02M 3/335; H02M 7/00
[52] U.S. Cl. ..................... 363/56; 363/21; 363/126
[58] Field of Search ..................... 363/20, 21, 16, 363/97, 56, 98, 126

[56] References Cited

U.S. PATENT DOCUMENTS 3,740,639 6/1973 Easter ...................... 321/323

*Primary Examiner*—Peter S. Wong
*Assistant Examiner*—Rajnikant B. Patel
*Attorney, Agent, or Firm*—Edward W. Goodman

[57] ABSTRACT

A switched-mode power supply includes a transformer ($L_p$, N), having its primary winding arranged to receive electric energy from an energy source ($U_{in}$) in periodically recurring time intervals (t0 to t1), and having at least one secondary winding enabling the energy to be taken from the transformer ($L_p$, N), and to be applied to a storage inductance ($L_o$) and a load impedance ($C_o$, $R_L$) by a rectifier arrangement (D1 to D4). An improved efficiency is obtained with a circuit of low complexity in that the rectifier arrangement (D1 to D4) includes three current paths, of which a first current path is adapted to supply energy to the storage inductance ($L_o$) and to the load impedance ($C_o$, $R_L$) during the time intervals (t0–t1), a second current path is adapted to demagnetize the transformer ($L_p$, N) via its secondary winding and the load impedance ($C_o$, $R_L$), and the third current path is adapted to demagnetize the storage inductance ($L_o$) via the load impedance ($C_o$, $R_L$), the second and the third current path being formed in such a manner that the demagnetizations of the transformer ($L_p$, N) and the storage inductance ($L_o$) are effected outside the time intervals (t0–t1) and, simultaneously, are not influenced by one another.

7 Claims, 4 Drawing Sheets

SWITCHED-MODE POWER SUPPLY

BACKGROUND OF THE INVENTION

1. Field of the Invention

The invention relates to a switched-mode power supply comprising a transformer, having a primary winding arranged to receive electric energy from an energy source in periodically recurring time intervals, and having at least one secondary winding enabling the energy to be taken from the transformer, and to be applied to a storage inductance and a load impedance by means of a rectifier arrangement.

The invention relates particularly to a switched-mode power supply of this type for the generation of one or more d.c. output voltages which are electrically isolated from an input voltage.

2. Description of the Related Art

Such circuit arrangements can be realized by means of an active circuit device. The different variants, such as forward convertors and flyback converters are known from the book "Schaltnetzteile-Grundlagen, Entwurf, Schaltungsbeispiele" by J. Wüstehube et al (Expert Verlag). In these known circuit arrangements, a transfer of energy from the primary side (input source) to the secondary side (power-consuming devices, load) is effected only during the on-time of the active circuit device (forward converter) or only during the off-time of the active circuit device (flyback converter). An essential drawback of this circuit arrangement is the inefficient use of the magnetic devices.

A circuit arrangement which allows an energy transfer during the on-time and off-time of the active circuit device is known from the article "A Dual Mode Forward/Flyback Converter" by J. N. Park and T. R. Zaloum (PESC 1982, 3). The circuit arrangement proposed therein requires two separate secondary windings for each output voltage required. This is a serious drawback, particularly in the case that a small winding space is available, or a large number of output voltages are required.

U.S. Pat. No. 3,740,639 discloses a switching regulator with a switch whose state of conduction is controlled in dependence on the voltage across a load. This switching regulator comprises a transformer whose primary winding is connected in a circuit with the switch. A rectifier and an inductive storage element are connected in a circuit with the secondary winding, a diode being included between one end of the secondary winding and one terminal of the load. This diode serves to transfer energy from the secondary winding to the load in the off-times of the switch.

However, it has been found that with the switching regulator in accordance with U.S. Pat. No. 3,740,639 an optimum energy transfer to the load is not possible depending on the dimensioning of the transformer and the inductive power storage element, and on the magnitude and form of the currents in the switching regulator.

It is an object of the invention to obtain the advantage of the energy transfer during the on-time and the off-time of the active switching element by means of only one secondary winding for each output voltage required and an optimum energy transfer, i.e., an improved efficiency, independently of the dimensioning of the elements of the switching regulator.

According to the invention this object is achieved in a switched-mode power supply of the type defined in the opening paragraph, in that the rectifier arrangement comprises three current paths, of which a first current path is adapted to supply energy to the storage inductance and to the load impedance during said time intervals, a second current path is adapted to demagnetize the transformer via its secondary winding and the load impedance, and the third current path is adapted to demagnetize the storage inductance via the load impedance, the second and the third current path being formed in such a manner that the demagnetizations of the transformer and the storage inductance are effected outside said time intervals and, simultaneously and are not influenced by one another.

Thus, in accordance with the invention, starting from the secondary winding, two separate current paths (power transmission paths) are obtained by means of rectifier elements (diodes) in order to transmit energy to the output of the switched-mode power supply and hence, to the load impedance during the on-time and off-time of an active switching device via which the electric power is applied to the primary winding in the periodically recurring time intervals. In the first current path (power transmission path) available for the energy transfer during the on-time of the active switching device, i.e., during the above-mentioned time interval, the storage inductance is included to limit the current increase in the secondary winding and to control the energy transferred in this switching state (mode). Freewheel operation of the storage inductance is possible via the third current path formed by the rectifier arrangement (diode arrangement). The power supply during the off-time of the active circuit device, i.e., outside said time interval, is provided by the energy stored in the transformer in analogy to the flyback converter. In the circuit arrangement in accordance with the invention, the third current path for the freewheel operation of the storage inductance is independent of the second current path for energy transfer from the transformer to the load impedance. This enables the energy stored in the storage inductance to be applied to the load impedance via the third current path with an optimum efficiency independently of the operating condition of the second current path.

The invention is based on the recognition of the fact that in the prior-art circuit arrangements known from U.S. Pat. No. 3,740,639 the demagnetization of the inductance of the transformer and the demagnetization of the inductive storage element do not proceed independently of each other. Particularly, in the last-mentioned prior-art arrangements, it appears that only the larger of the currents in the secondary winding of the transformer and the inductive storage element transfers energy to the load during the off-time of the switch. Thus, the efficiency of this switching regulator ultimately depends, in an arbitrary manner, on the selected dimensioning and the operating condition.

The present invention, however, enables an optimum efficiency to be obtained with a low circuit complexity.

In a preferred embodiment, the switched-mode power supply in accordance with the invention is constructed in such a manner that the rectifier arrangement comprises a bridge arrangement with four rectifier elements each arranged in one branch of the bridge arrangement as in a bridge rectifier, whose input terminals are connected to the secondary winding and whose output terminals are connected to the load impedance, the rectifier elements of a first one and a second one of the branches forming the first current path and the other rectifier elements being in their cut-off states during said time intervals, the rectifier elements of the third and of the fourth branch of the rectifier arrangement forming the second current path, and the storage inductance being arranged in the first branch of the bridge arrangement in series with the rectifier element in such a manner that the first and the fourth branch of the bridge arrangement form the third current path.

This results in a simple and compact construction of the circuit, in which the rectifier elements of the first and the fourth branch perform a double function inasmuch as they each form not only a part of the first and a part of the second current path, respectively, but together they also form the third current path. In a modification of this circuit arrangement the rectifier arrangement, comprises a fifth branch with a rectifier element, the storage inductance in the first branch of the bridge arrangement has one end connected to the adjacent output terminal, and the fifth branch shunts the series arrangement of the fourth branch and the rectifier element of the first branch. This fifth branch relieves the rectifier elements of the first and the fourth branch of the bridge circuit of the demagnetization current of the storage inductance. This may be advantageous for the dimensioning of the rectifying elements.

It may also be advantageous to construct the switched-mode power supply, in accordance with the invention, in such a manner that the secondary winding has a tapping to which the second branch of the bridge arrangement is coupled, the node between the first and the fourth branch forming the first input terminal and the third branch being coupled to the second input terminal. This tapping results in an increased transformation ratio of the transformer for the energy transfer during said time intervals, i.e., during the on-time of the active circuit device.

Another modification of the switched-mode power supply, in accordance with the invention, is constructed in such a manner that the secondary winding has a tapping to which the third branch of the bridge arrangement is coupled, the node between the first and the fourth branch forming the first input terminal and the second branch being coupled to the second input terminal. When the tapping of the secondary winding is connected in this way, the transformation ratio for the energy transfer during the off-time of the active circuit device, i.e., between each time two of said time intervals, is increased.

The switched-mode power supply, in accordance with the invention, may comprise one or more secondary windings arranged as described above. Thus, in its simplest form, only one simple secondary winding is required for each electrically isolated d.c. output voltage. For each d.c. output voltage, the ratio between the energy transmitted during the on-times (said time intervals) and that transmitted during the off-times (times between said time intervals) can be selected separately through the ratio between the primary inductance of the transformer and the inductance of the respective secondary winding. Moreover, the transformer of the switched-mode power supply, in accordance with the invention, can be connected to outputs for electrically isolated d.c. output voltages, which outputs are simply energized only during the off-times of the active circuit device in a manner known per se, as in a flyback converter, or only during the on-times of said active circuit device, as in forward converters which are known per se.

BRIEF DESCRIPTION OF THE DRAWINGS

The invention will be described in more detail hereinafter with reference to the drawings. In the drawings.

DESCRIPTION OF THE PREFERRED EMBODIMENTS

Figure 1:
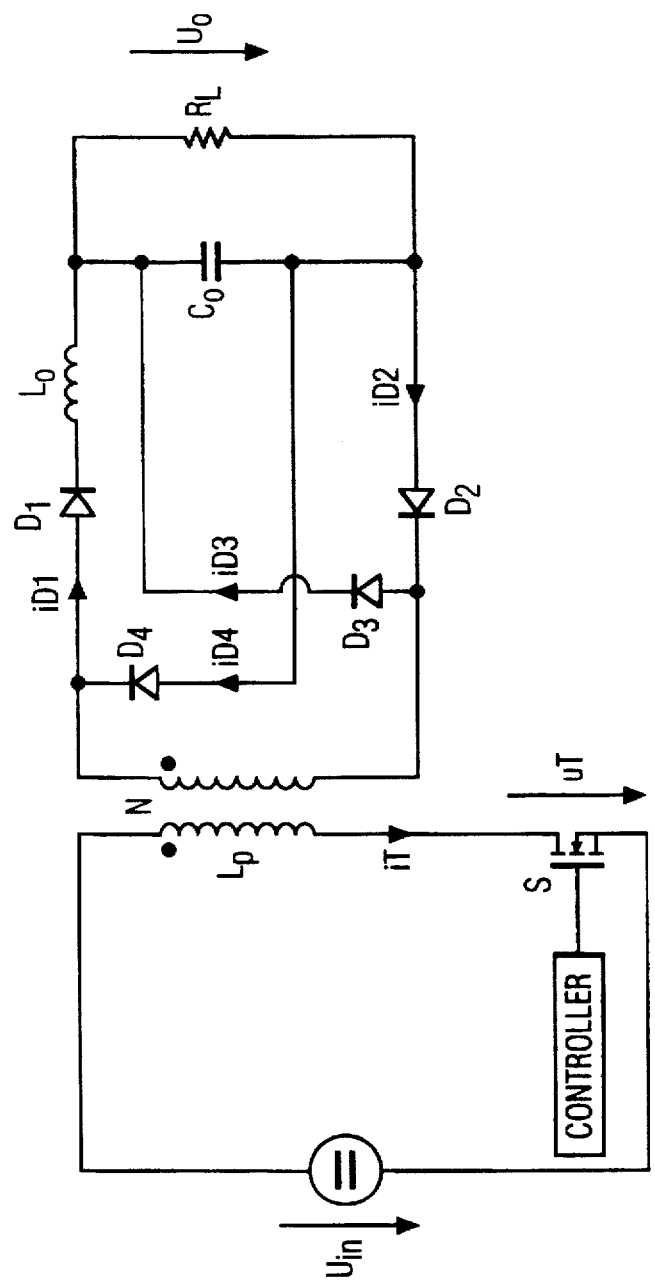
FIG. 1 shows a first embodiment of a switched-mode power supply in accordance with the invention.

In FIG. 1, a circuit arrangement includes an energy source, which basically supplies a direct voltage Uin, the primary winding $L_p$ of a transformer having the transformation ratio N, and a transistor S, which forms the active circuit device. In a manner known per se, the transistor S is alternately turned on and turned off by a control circuit ("control") via its control terminal.

A secondary winding of the transformer is connected to a rectifier arrangement comprising four rectifier elements (diodes) D1, D2, D3 and D4, each included in a branch of a bridge arrangement. An input terminal, formed by the node between the first rectifier element D1 and the fourth rectifier element D4, is connected to one end of the secondary winding, and a second input terminal, formed by the node between the third rectifier element D3 and the second rectifier element D2, is connected to the other end of the secondary winding of the transformer. A storage inductance $L_o$ is connected in series with the first rectifier element D1, and its load-side terminal connected to the third rectifier element D3 forms a first output terminal of the rectifier arrangement. The second output terminal of the rectifier arrangement is formed by the node between the second rectifier element D2 and the fourth rectifier element D4. The parallel arrangement of a load resistor $R_L$ and a smoothing capacitor $C_o$ forms a load impedance arranged between the two output terminals of the rectifier arrangement.

Figure 5:
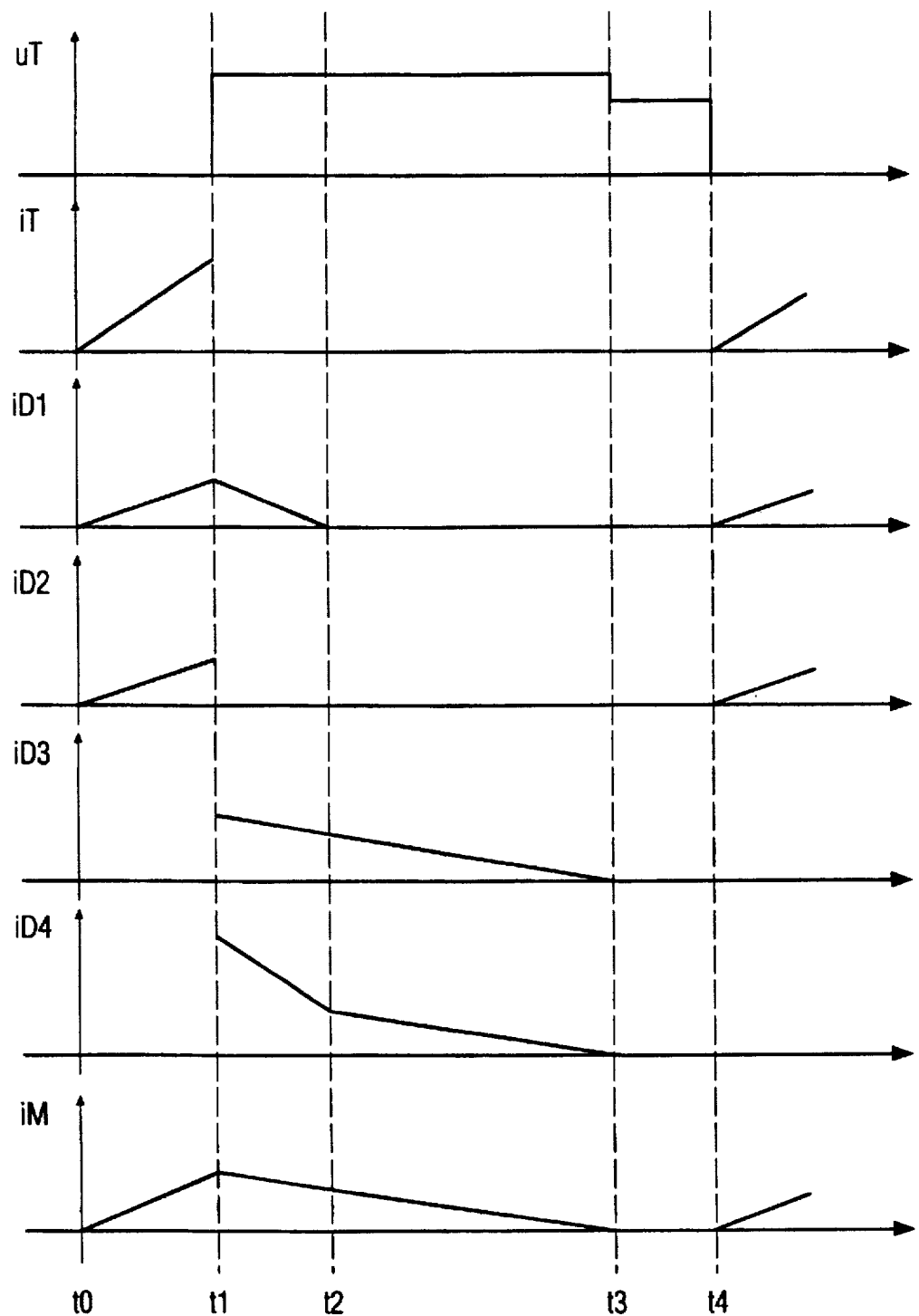
FIG. 5 shows waveform diagrams to clarify FIG. 1.

The operation of the circuit arrangement can be described in the simplest manner with reference to the embodiment of FIG. 1 with the aid of the associated current and voltage diagrams shown in FIG. 5. The diagrams in FIG. 5 show the basic waveforms which are exemplary of the situation in which both the transformer and the output coil operate discontinuously. For the sake of simplicity, an embodiment with only one output voltage will be considered.

The transistor S is turned on by the control circuit at the instant t0 and is not turned off until the instant t1. During this on-time t0–t1 the voltage uT at the transistor is zero and the entire input voltage Uin appears at the primary side of the transformer. Depending on the selected transformation ratio N, the voltage Uin/N will appear at the secondary side of the transformer.

The current iT through the transistor has two components. The first component corresponds to the magnetizing current $i_m$ of the transformer. This magnetizing current $i_m$ increases linearly during the on-time in accordance with the relationship:

$$i_m(t) = \frac{Uin}{LP} \cdot t$$

Here, Lp is the inductance of the primary winding of the transformer.

The second component corresponds to the current referred to the primary side, which current flows to the secondary side of the transformer (in the case of a suitable choice of the transformation ratio: N<Uin/Uo). This current to the primary side takes the current path D1-Lo-Co//RL-D2. It also increases linearly because the fixed difference voltage Uin/N-Uo appears across the output inductance Lo. The currents iD1 and iD2, in the time interval t0–t1 consequently comply with:

$$iD1(t) = iD2(t) = \frac{Uin/N - Uo}{Lo} \cdot t$$

These two current components correspond to the two energy quantities described above. The magnetizing current is characteristic of the energy stored in the transformer and transferred during the off-time. The current at the secondary side is a measure of the energy supplied directly to the secondary side during the on-time t0–t1.

The currents through the diodes D3 and D4 are zero because they are poled in the reverse direction as a result of the voltage applied via the secondary winding.

At the instant t1, the transistor is turned off via the control circuit and, consequently, the current through the transistor becomes zero. The energy stored in the transformer is delivered via the current path D3-Co/RL-D4 at the secondary side. Since D3 and D4 conduct, the output voltage Uo appears across the secondary winding. This voltage is transformed to the primary side with the transformation ratio, so that a voltage Uin+N·Uo appears across the transistor.

The current waveforms, in the time interval t1–t2 comprise two components. The first component is produced by the demagnetization of the output inductance Lo. The freewheel branch for this inductance is established by the diodes D1 and D4. During the time interval t1–t2 a voltage –Uo appears across the output inductance Lo and the current through Lo (which corresponds to iD1) decreases linearly in accordance with:

$$iD1(t) = iD1(t1) - \frac{Uo}{Lo} \cdot (t - t1)$$

The second component is generated by the demagnetization of the transformer and flows through the diodes D3 and D4. This current also decreases as a linear function of time:

$$iD3(t) = N \cdot \left[ i_m(t1) - \frac{N \cdot Uo}{Lp} \cdot (t - t1) \right]$$

The current through the diode D4 is obtained by addition of the currents in the diodes D1 and D3, because it is involved in both demagnetization processes. The current through the diode D2 becomes zero at the instant t1 because it is poled in the reverse direction as a result of the sign reversal of the voltage across the secondary winding.

In the present example, the current through the diode D1 becomes zero at the instant t2, and D1 starts to be cut off. The demagnetization of the transformer has not yet ceased so that the current iD3 continues to decrease linearly. Since iD1 is zero as from the instant t2, the current through the diode D4 in the interval t2–t3 corresponds to the current through the diode D3.

At the instant t3, the current through the diodes D3 and D4 also becomes zero for the discontinuous case described here. As a result, the voltage across the secondary winding also becomes zero, so that the voltage across the transistor is equal to the input voltage in the remaining time interval t3–t4. The instant t4 marks the end of the period considered, which is repeated from this point.

By varying the on-time (duty cycle), the output voltage Uo is maintained constant in the case of fluctuations of the load or the input voltage. Duty cycle control is possible by means of conventional control circuits.

Figure 2A:
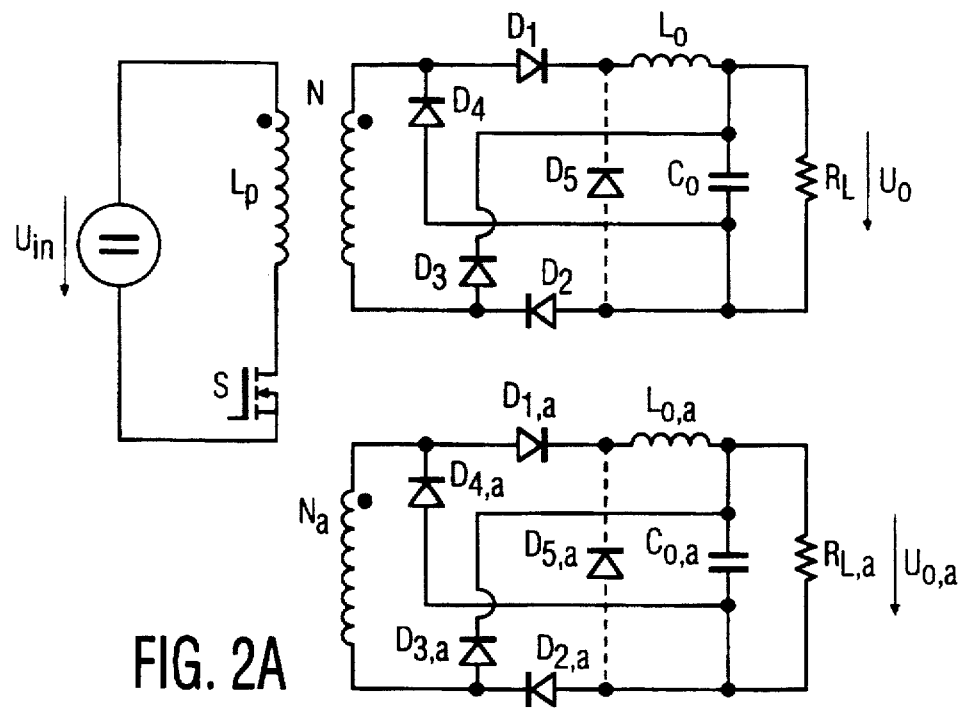
FIGS. 2A–2C show an embodiment of the invention with an alternative possibility of realizing the freewheel operation for the output inductance and of realizing further output voltages.
Figure 2B:
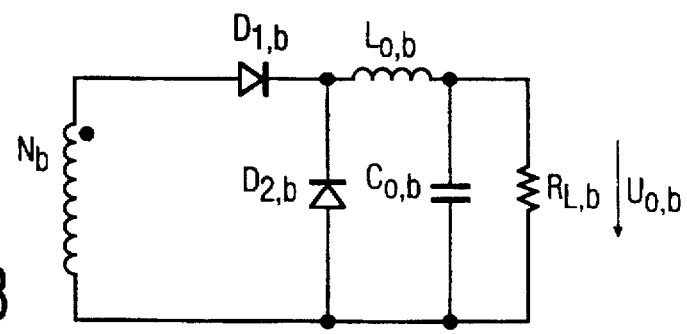
Figure 2C:
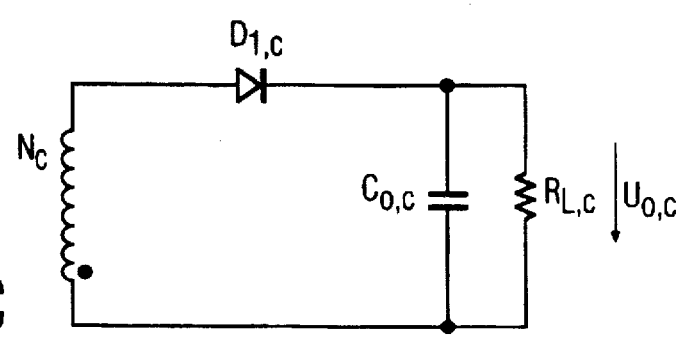

FIGS. 2A–2C show an alternative possibility of realizing freewheel operation for the output inductance. In this case, the diode D5 shown in broken lines, provides the freewheel path, i.e., it handles the current of the output inductance in the time interval t1–t2. The diode D1 is cut off together with the diode D2 from the instant t1 at which the transistor is turned off. Since the diode D4 is no longer disposed in the freewheel path, the current variation in D4 corresponds to that in D3, i.e., the current loads of D1 and, particularly, of D4 decrease (at the expense of a further power diode).

Figure 3:
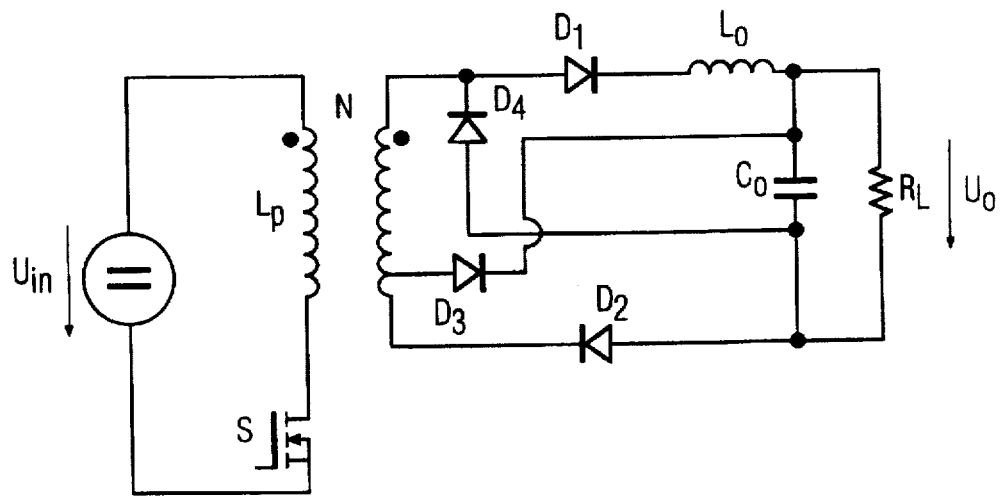
FIG. 3 shows a possible realization of a larger transformation ratio for the energy transmission during the off-time
Figure 4:
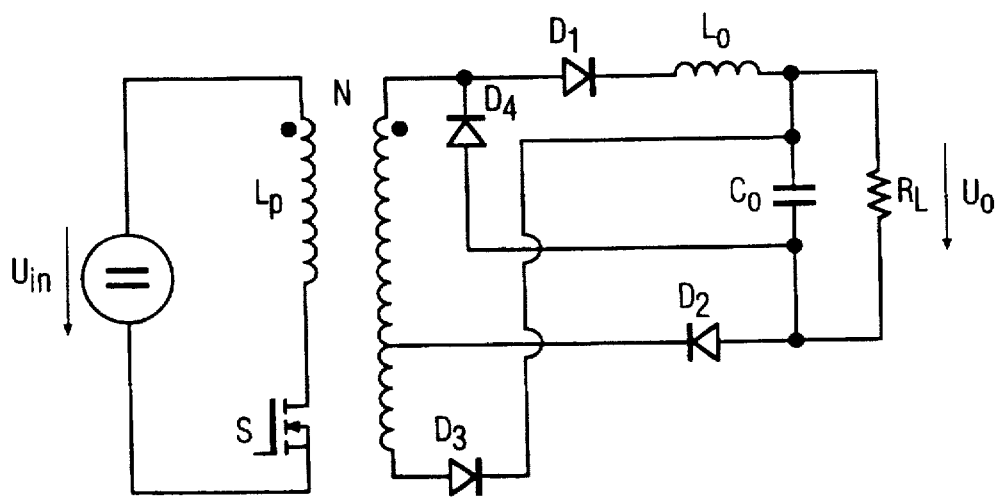
FIG. 4 shows a possible realization of a larger transformation ratio for the energy transmission during the on-time.

FIGS. 3 and 4 show embodiments which enable operation with different transformation ratios to be obtained by means of a simple tapping. FIG. 3 shows the arrangement for a larger transformation ratio during the off-time, and FIG. 4 shows that for a larger transformation ratio during the on-time. The arrangement of FIG. 3 only differs from that in FIG. 4 in that the third rectifier element D3 is no longer connected to the second rectifier element D2, but to the tapping of the secondary winding of the transformer. Instead of this, the second rectifier element D2 in FIG. 4 is connected to the tapping of the secondary winding of the transformer instead of to the third rectifier element D3.

The transformer enables a plurality of electrically isolated d.c. output voltages to be obtained. There are various possibilities of generating such output voltages. The first possibility is to generate further output voltages via similar arrangements at the secondary side. The output power for each output can then be divided separately for each output (into power components transmitted during the on-time and during the off-time). This division is determined by the output inductance used in each case.

Thus, the two other possibilities now also follow directly. These are the two 100% limit cases, i.e., energy is transferred only during the on-time or only during the off-time. The first case corresponds to a secondary arrangement similar to the forward converter (see FIG. 2B) and the second case corresponds to a secondary arrangement similar to the flyback converter (see FIG. 2C).

We claim:

1. A switched-mode power supply comprising a transformer having a primary winding for receiving electric energy from an energy source in periodically recurring time intervals, and at least one secondary winding enabling the energy to be taken from the transformer for application to a storage inductance and a load impedance by means of a rectifier arrangement, characterized in that the rectifier arrangement comprises a first current path for supplying energy to the storage inductance and to the load impedance during said periodically recurring time intervals, a second current path for demagnetizing the transformer via the secondary winding and the load impedance, and a third current path for demagnatizing the storage inductance via the load impedance, the second current path and the third current path being formed in such a manner that the demagnetizations of the transformer and the storage inductance are effected outside said periodically recurring time intervals and simultaneously and are not influenced by one another.

2. A switched-mode power supply as claimed in claim 1, characterized in that the rectifier arrangement comprises a bridge arrangement with four rectifier elements each arranged in one branch of the bridge arrangement as in a bridge rectifier, said bridge arrangement having input terminals connected to the secondary winding, and output terminals connected to the load impedance, the rectifier elements of a first one and a second one of the branches forming the first current path and the other rectifier elements being in their cut-off states during said periodically recurring time intervals, the rectifier elements of the third branch and of the fourth branch of the rectifier arrangement forming the second current path, and the storage inductance being arranged in the first branch of the bridge arrangement in series with the rectifier element in such a manner that the first branch and the fourth branch of the bridge arrangement form the third current path.

3. A switched-mode power supply as claimed in claim 2, characterized in that the rectifier arrangement comprises a fifth branch with a rectifier element, the storage inductance in the first branch of the bridge arrangement has one end connected to the adjacent output terminal, and the fifth branch shunts the series arrangement of the fourth branch and the rectifier element of the first branch.

4. A switched-mode power supply as claimed in claim 2, characterized in that the secondary winding has a tapping to which the second branch of the bridge arrangement is coupled, the node between the first and the fourth branch forming the first input terminal and the third branch being coupled to the second input terminal.

5. A switched-mode power supply as claimed in claim 2, characterized in that the secondary winding has a tapping to which the third branch of the bridge arrangement is coupled, the node between the first and the fourth branch forming the first input terminal and the second branch being coupled to the second input terminal.

6. A switched-mode power supply as claimed in claim 3, characterized in that the secondary winding has a tapping to which the second branch of the bridge arrangement is coupled, the node between the first and the fourth branch forming the first input terminal and the third branch being coupled to the second input terminal.

7. A switched-mode power supply as claimed in claim 3, characterized in that the secondary winding has a tapping to which the third branch of the bridge arrangement is coupled, the node between the first and the fourth branch forming the first input terminal and the second branch being coupled to the second input terminal.

* * * * *